March 31, 1964     G. SPRINGER ETAL     3,126,948
CAKE PAN STAND
Filed Sept. 11, 1961     2 Sheets-Sheet 1
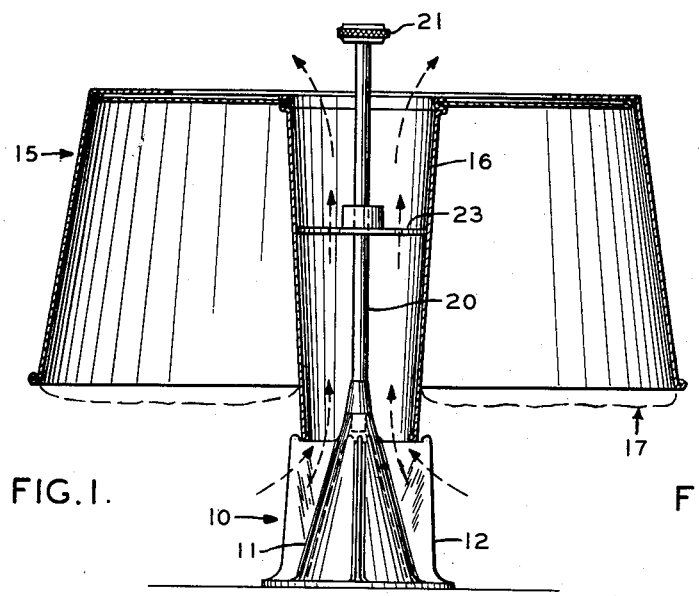
FIG.1.
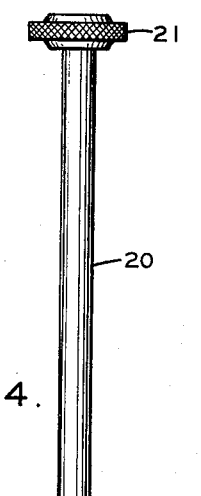
FIG.4.
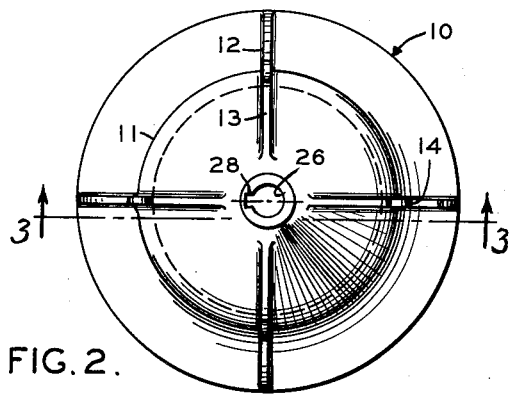
FIG.2.
FIG.3.
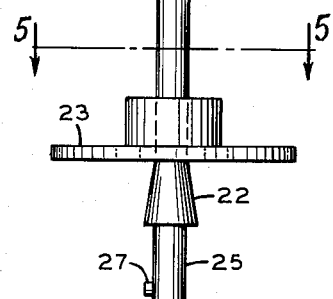
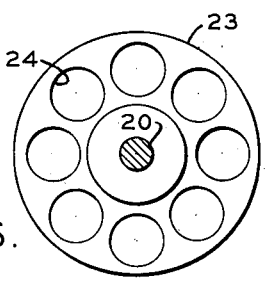
FIG.5.
INVENTORS
GEORGE SPRINGER
HENRIETTA A. SPRINGER
BY
*Cohn and Powell*
ATTORNEYS March 31, 1964   G. SPRINGER ETAL   3,126,948
CAKE PAN STAND Filed Sept. 11, 1961   2 Sheets—Sheet 2

INVENTORS
GEORGE SPRINGER
HENRIETTA A. SPRINGER
BY *Cohn and Powell*
ATTORNEYS

3,126,948
CAKE PAN STAND
George Springer and Henrietta A. Springer, St. Charles, Mo. (both of 3413 Ashby Road, St. Ann, Mo.)
Filed Sept. 11, 1961, Ser. No. 137,167
6 Claims. (Cl. 165—67)

This invention relates generally to improvements in a cake pan stand, and more particularly to an improved stand adapted to support a cake pan of the tube type.

Certain of the features of the present assembly are disclosed and claimed in copending U.S. Patent No. 3,066,918 issued December 4, 1962 and entitled "Cake Pan Stand," of which the present application is a continuation-in-part.

It has been the general practice in baking cakes, bread and the like to deposit the baked product on a surface, such as a grill or the like for cooling under atmospheric or other conditions, shortly after withdrawing the baked product from the oven. Because of the plastic or fragile nature of the product before it is cold, the weight of the upper portion of a cake or bread exerted on the lower portion greatly impairs the texture of the product. This undesirable result is caused by a compression or a collapse of the cell structure, whereby the product becomes doughy or crumbles.

Also in general use for baking specific kinds of bakery products are cake pans of the tube type. These pans are well-known and include a central tubular portion which leaves an opening at the center of the cake baked in such a pan. Tube pans are used primarily for sponge cakes, angel food cakes and particularly the newer chiffon cakes.

In some cases, the central tube of these pans extends above the outer rim of the pan to facilitate the support of the pan in inverted position while the cake is cooling. Because the top of this tubular portion is relatively narrow, its use as a support leaves the inverted cake in a relatively unstable position. Furthermore, the tube ordinarily fails to extend far enough above the remainder of the pan to provide adequate space beneath the inverted cake for circulation of air during cooling. Accordingly, it is a general practice to use an inverted funnel or a beverage bottle as an auxiliary support for the inverted tube pan. However, these makeshift supports are still relatively unstable and do not provide for efficient cooling of the cake pan or the cake contained therein.

One attempt to avoid the difficulties discussed above involves the use of a plurality of legs extending upwardly from the rim of the pan, these legs serving to support the pan in inverted position. However, these projecting legs are easily damaged and interfere with stacking of the cake pans into storage.

An important object is to provide a cake pan support for tube type pans that functions not only to preserve, but to enhance the texture of sponge, angel food and the like cakes, and to increase the lightness and fluffiness of such cakes.

Another important objective is achieved by the stand in that the process of cooling sponge, angel food and like cakes and bakery products is materially improved so that the cellular structure of the product is maintained and enhanced, and consequently baking failures caused by "falling" during cooling is eliminated.

Still another important object is realized by the provision of a stand that serves to support the hollow center tube of the cake pan when inverted, thereby enabling the bakery product to cool while being suspended from the interior surfaces of the container in which the product was baked.

In carrying out the invention, the sponge, angel food and like cake is removed from the oven after completion of the baking operation, and the product is inverted and maintained in this position on the stand during the cooling operation. During such cooling, the product freely hangs from the inner surfaces of the container, the container being maintained in a substantially vertical position. The forces of gravity are, of course, exerted downwardly within the product and these forces tend to expand the minute cells, thus providing an increased fluffiness and a lighter final product. The product which adheres to the interior of the baking pan during cooling, will not "fall" and the walls of the cell structure will not collapse. The term "fall" or "falling" is used in the bakery trade to denote the collapse or crushing of the cellular structure.

While the process of this invention is particularly adapted for cooling sponge and angel food cakes, which normally adhere to the walls of the container in which they are baked, it is within the contemplation of the invention to employ the herein disclosed stand for cooling any bakery products that will normally adhere to a tube type baking pan or any product which can be caused to adhere to a tube type baking pan.

Yet another important object is achieved by providing a stand base having a substantially conical post, and a plurality of supports extending radially outward from the post adapted to support the hollow center element of the inverted cake pan, the conical post and supports providing air passages that communicate with the open end, and hence with the interior, of the center elements for improved cooling of the bakery product.

Another important objective is realized by the provision of the radially extending supports of the conical post which facilitate the dissipation of the heat to the atmosphere and thereby prevent excessive heating of the stand while supporting the inverted pan.

Other important advantages are afforded by the conical post and radial supports in providing an exceedingly stable structure that will not tip while supporting an inverted tube type baking pan.

Still another important object is achieved by the provision of a stabilizer mechanism that cooperates with the base to hold the cake pan on the base and to preclude tipping. Briefly, the cake pan stand of this invention includes a base adapted to support the hollow center element of an inverted cake pan, and means connected to the base and adapted to extend upwardly into the center element and adapted to wedge in the center element to afford the above mentioned functional results.

Another important objective is achieved by constructing the stabilizing mechanism of an elongate rod detachably connected to the base, and a collar slidably mounted on the rod for longitudinal axial movement therealong. The slidable collar will automatically wedge against the interior wall of the usually tapered center element of the cake pan. This wedging action holds the center element securely on the supports of the base and tends to prevent lateral tipping of the pan. Because the collar is slidably mounted, the cake pan stand is adapted for use with all of the tube type pans currently on the market, the collar adjusting automatically to the particular size and shape of the center element.

As stated previously, the base of the cake pan stand is provided with means providing an air passage communicating with the open end of the center element of the cake pan. To facilitate the free flow of air through the center element for improved cooling of the pan and of the bakery product contained therein, the collar is provided with means, usually consisting of apertures, through which the air can flow.

Another important objective is achieved by constructing the connection of the rod with the stand base in a manner so that the weight of the stand under gravity will tend to turn the stand base in a direction so as to tighten the connection of the stand base and rod, when the stand is held by the rod. This feature tends to avoid unintentional and undesirable disconnection of the stabilizing mechanism with the stand base.

An important object is to provide a cake pan stand that is simple and durable in construction, economical to manufacture, efficient in operation, and which can be readily utilized by anyone with only a minimum of instruction.

The foregoing and numerous other objects and advantages of the invention will more clearly appear from the following detailed description of a preferred embodiment, and one of modification thereof, particularly when considered in connection with the accompanying drawings, in which:

FIG. 1 is a side elevational view of the cake pan stand, showing the tube type cake pan in cross section and showing the pan supported on the stand;

FIG. 2 is a top plan view of the base of the cake pan stand;

FIG. 3 is a cross sectional view of the stand base as seen along line 3—3 of FIG. 2;

FIG. 4 is a side elevational view of the stabilizing mechanism;

FIG. 5 is a cross sectional view as seen along line 5—5 of FIG. 4;

Figure 6:
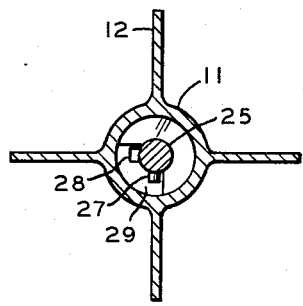
FIG. 6 is a cross sectional view of the base as seen along line 6—6 of FIG. 3.

Referring now by characters of reference to the drawings, it is seen that the cake pan stand includes a base 10 adapted to seat on a supporting subjacent surface such as a table or counter top. Extending upwardly from the center of the base 10 is a vertical, substantial conical center post 11. In order to make the pan stand light in weight and to effect an economy in material, the conical post 11 is substantially hollow as is best seen in FIG. 3.

Extending radially outwardly from the conical post 11 are a plurality of supports 12. In the embodiments disclosed, there are a total of four supports 12 equidistantly spaced angularly about the post 11, i.e., the supports 12 being disposed in 90 degree relationship. Of course, any suitable number of supports 12 can be conveniently and advantageously utilized in the stands.

Each of the supports 12 is provided with an uppermost margin 13 that extends substantially horizontal from the uppermost portion of the conical post 11; these uppermost margins 13 are provided with an upwardly extending tip 14 at their outermost ends.

In the preferred embodiment, the cake pan stand is cast or molded as an integral, unitary piece. In other words, the base 10, conical post 11 and supports 12 are formed integrally.

The tube type cake pan generally indicated at 15 in FIG. 1 includes a center element or tube 16 that normally extends below the rim of the pan 15 when the pan is inverted as shown. The outermost end of center element 16 seats on and is supported by the upper margins 13 of supports 12. For completeness of disclosure, a portion of the cake or other bakery product contained in the pan is illustrated in broken lines in FIG. 1 and is indicated by reference numeral 17.

It is apparent from FIG. 1, that the outer peripheral diameter of the conical post 11 in a horizontal plane passed through the upper margins 13 of the supports 12 at the points engaged by the hollow center element 16 of the inverted cake pan 15 is less than the innermost diameter of the center element 16 so as to provide spaces therebetween through which air flows into the interior of the center element 16. The conical post 11 and the supports 12 define air passages that extend upwardly and communicate with the interior of center element 16 through the spaces between the post 11 and the center element 16.

The flow of air, as is indicated by arrows in FIG. 1, is upwardly along the outer surface of conical post 11, the air flow being guided in the upward direction and hence guided into the open end of center element 16 by the supports 12 to effect an efficient cooling of the inner portion of the cake 17 adjacent the center element 16.

The supports 12 provide other advantages in that they present more surface area to the atmosphere and thereby effect a more efficient dissipation of the heat transmitted to the stand by the center element 16 to the atmosphere. Thus it is seen that the cake pan stand does not become excessively heated, but on the contrary any heat transmitted to the stand will be quickly dissipated to the surrounding atmosphere by supports 12.

The stabilizing mechanism includes an elongate rod 20 having a knob 21 attached to one end by which the rod 20 can be gripped and by which the stand can be held. The rod 20 is of a length so that the upper end containing the knob 21 projects above the cake pan when the rod 20 is attached to the base 10 and when the pan 15 is inverted in supported relation as disclosed in FIG. 1. The opposite end of rod 20 is provided with an enlarged, upwardly tapered portion 22 that conforms substantially to the continuous configuration of the conical post 11 when the rod 20 is attached.

Slidably mounted on rod 20 is a circular collar 23, the collar 23 being movable axially along the rod 20 between limits defined by knob 21 and enlarged portion 22. For reasons which will later appear, the collar 20 is provided with a plurality of apertures 24 through which air can freely flow.

To connect the rod 20 with the base 10, a short rod portion 25 immediately below the tapered portion 22 is inserted into a compatible opening 26 formed in the top of conical post 11. A key 27 is formed on rod portion 25 and is adapted to interfit a keyway 28. After the rod is fully inserted as described above, the rod 20 is turned so that the key 27 fits under and engages a transverse shoulder 29. As will appear, the inclination of shoulder 29 with respect to the horizontal tends to cause the key 27 to ride therealong under gravity away from the keyway 28 when the pan is turned to its inverted position and supported by the rod 20 and the base 10. This action tends to preclude unintentional disengagement of the rod 20 with the base 10.

Figure 7:
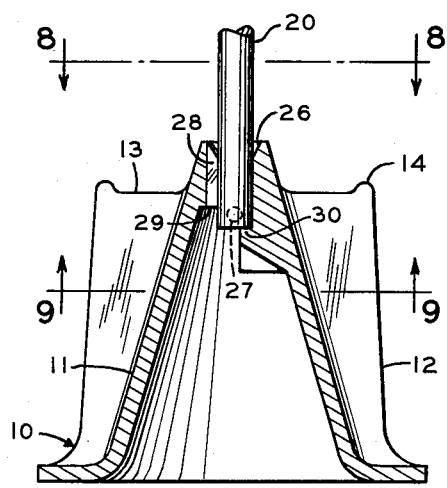
FIG. 7 is a cross sectional view of a modified construction of the stand base and connected rod.
Figure 8:
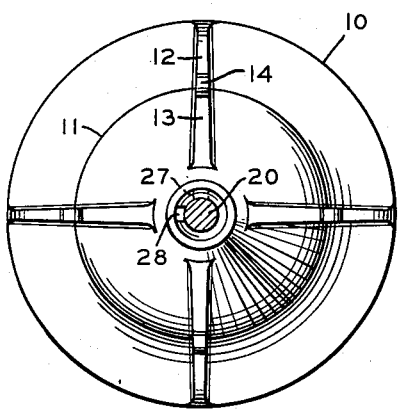
FIG. 8 is a top plan view of the modified stand base of FIG. 7, as seen along line 8—8.
Figure 9:
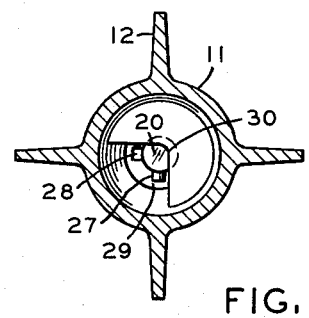
FIG. 9 is a cross sectional view of the stand base as seen along line 9—9 of FIG. 7.

A modified construction of the rod 20 and its connection with the base 10 is shown in FIGS. 7–9 inclusive. For example, the rod 20 is perfectly straight and of a constant diameter, there being no corresponding enlarged tapered portion 22 as is disclosed in FIG. 4.

In this embodiment, the base 10 is constructed internally of the conical post 11, to provide a seat 30 on which the bottom end of rod 20 is supported, when the rod 20 is inserted into the base aperture 26. Otherwise, the construction, mode of operation and functional results of the unit disclosed in FIGS. 7–9 is the same as that previously described with respect to FIGS. 1–6.

It is thought that the mode of operation and functional advantages of the cake pan stand have become fully apparent from the foregoing detailed description of parts, but for completeness of disclosure the use of the stand will be briefly described. It will be assumed that the rod 20 is disconnected from the base 10.

After baking, the cake pan together with the cake contained in such pan, is inverted, and the lower end of the center element 16 is seated on the upper margin 13 of the stand supports 12. The upper portion of the conical post 11 fits into the center element 16. Then, the rod 20 together with its attached collar 23 is inserted through the opposite or upper open end of center element 16. The key 27 is aligned with the compatible keyway 28 and the lower rod portion 25 is inserted into the post opening 26. By turning the rod 20, the key 27 is misaligned with the keyway 28 and fits under the transfer shoulder 29, thereby operatively connecting the rod 20 to the base 10.

It will be importantly noted that the collar 23 slides along the rod 20 until it wedges automatically against the interior surface of center element 16. This wedging action of collar 23 automatically centers the center element 16 on the base 10, and consequently on the supports 12, and serves to hold the center element 16 securely seated on the upper margins 13. In all known tube type pans, the center element 16 is tapered as is illustrated in FIG. 1. Although the center element 16 may be of different diameters, the collar 23 will automatically accommodate any of the conventional center elements 16 by sliding axially along rod 20.

The knob 21 is located above the plan 15 when inverted as shown in FIG. 1, and affords a grip whereby the stand and the cake pan seated and retained on such stand, can be lifted and moved to various locations without disturbing the stability of the stand and without causing any detrimental effects to the cake.

Cooling air flows upwardly along the conical post 11 between the supports 12, and the supports 12 guiding the air flow through the spaces between the center element 16 and the conical post 11 and thence into the interior of center element 16. The thermal effects of this column of air in center element 16 causes a flow of air through the collar apertures 24. This flow of air cools the center of the tube type pan and hence cools the inside of the cake 17. Because of this more effective cooling feature, lighter, fluffier and better textured cakes are realized. Because the supports 12 extend substantially the entire height of the conical post 11, and because the supports 12 contact the air flow for a substantial distance in its travel upwardly through the open end of center element 16, the supports 12 serve to dissipate heat from the base 10 to the surrounding atmosphere. This results in keeping the stand cool and consequently results in more effective cooling of the interior of the tube type pan 15.

This stabilizing mechanism cooperates with the base to provide a rigid unit with the connected cake pan 15 which is exceedingly stable in nature.

Although the invention has been described by making detailed reference to a preferred embodiment, and a modification thereof, such detail is to be understood in an instructive, rather than in any restrictive sense, many variants being possible within the scope of the claims hereunto appended.

We claim as our invention:

1. A cake pan and stand comprising an inverted cake pan having a hollow center element, a base supporting the hollow center element of said inverted cake pan, an elongate rod detachably connected to said base and extending upwardly into said center element, and a collar slidably mounted on and carried by said rod and wedging in said center element upon sliding freely under gravity down the rod into engagement with the center element.

2. A cake pan and stand comprising an inverted cake pan having a hollow center element, a base adapted to support the hollow center element of said inverted cake pan, an elongate rod detachably connected to said base and extending upwardly into said center element, a collar slidably mounted on said rod and wedging in said center element, means on said base providing air passages that communicate with the interior of said center element, said collar having means permitting flow of air through said center element.

3. A cake pan and stand comprising an inverted cake pan having a hollow center element, a base having a substantially vertical and conical center post, a plurality of supports extending outwardly from said post, said supports being adapted to seat the hollow center element of said inverted cake pan, a rod detachably connected to the conical center post of said base and extending into said center element of said pan, a collar slidably mounted on said rod and wedging in said center element of said pan, said supports having spaces therebetween open to provide inlets to air passages communicating with the interior of said center element of said pan, and means in said collar permitting flow of air through said center element of the pan.

4. A cake pan and stand comprising an inverted cake pan having a hollow center element, a base adapted to support the hollow center element of said inverted cake pan, a rod detachably connected to said base and extending upwardly into said center element, a collar slidably mounted on said rod and wedging in said center element, means on said base providing air passages communicating with the interior of said center element, said collar being provided with apertures through which air can freely flow in movement completely through said center element.

5. A cake pan and stand comprising an inverted cake pan having a hollow center element, a base having a substantially vertical and conical center post, a plurality of supports extending outwardly from said post, said supports including upper margins adapted to seat the hollow center element of said pan in spaced relation to the post to provide air passages therebetween, the said supports having spaces therebetween open below said upper margins to provide inlets to said air passages, a rod detachably connected to said base and extending into said center element, and a collar slidable longitudinally along said rod and wedging in said center element, said collar being provided with apertures permitting flow of air through said center element of said pan.

6. A cake pan and stand comprising an inverted cake pan having a tapered hollow center element, a base supporting the tapered hollow center element of said inverted cake pan, an elongate rod detachably connected to said base, a collar carried by said rod and slidably mounted for axial movement along said rod and wedging in said tapered center element upon sliding freely under gravity down the rod into engagement with the center element, and means on said rod constraining the axially sliding movement of said collar on said rod between limits, and holding the collar on the rod upon attachment and detachment of the rod from the base and upon withdrawal from the center element.

References Cited in the file of this patent

UNITED STATES PATENTS

| | | |
|---|---|---|
| 1,918,583 | Bear | July 18, 1933 |
| 2,188,955 | Nattson | Feb. 6, 1940 |
| 2,661,679 | Van Guilder | Dec. 8, 1953 |
| 2,777,308 | Roberts et al. | Jan. 15, 1957 |

FOREIGN PATENTS

| | | |
|---|---|---|
| 159,560 | Great Britain | Feb. 21, 1921 |